United States Patent

Bhagavath

[19]

[11] Patent Number: 5,835,125
[45] Date of Patent: Nov. 10, 1998

[54] SELF-HEALING CONFIGURATION FOR DELIVERING DATA SERVICES ON A HYBRID FIBER-COAXIAL (HFC) NETWORK

[75] Inventor: Vijay K. Bhagavath, Eatontown, N.J.

[73] Assignee: AT&T Corp, Middletown, N.J.

[21] Appl. No.: 794,075

[22] Filed: Feb. 4, 1997

[51] Int. Cl.[6] .................................................. H04N 7/10
[52] U.S. Cl. .............................. 348/6; 455/6.2; 455/3.1
[58] Field of Search .............................. 348/6, 192, 12, 348/7; 455/3.1, 3.2, 6.2, 4.1; 371/20.1, 20.2

[56] References Cited

U.S. PATENT DOCUMENTS

| | | | |
|---|---|---|---|
| 4,979,230 | 12/1990 | Marz | 455/3 |
| 5,073,930 | 12/1991 | Green et al. | 380/10 |
| 5,434,610 | 7/1995 | Lovelers | 348/6 |
| 5,712,897 | 1/1998 | Ortel | 455/6.1 |
| 5,748,493 | 5/1998 | Lightfoot | 348/6 |

Primary Examiner—Victor R. Kostak
Attorney, Agent, or Firm—Stephen M. Gurey

[57] ABSTRACT

When a cable or equipment failure interrupts delivery of data services being transmitted to subscriber clients located in a first access area on a modulated RF carrier signal over a hybrid fiber-coaxial cable network, at least one channel within the roll-off spectrum above the passband of the coaxial amplifiers in the network is used as a protection data channel to supply these data services to the affected subscriber clients via an alternate signal path through an adjoining second access area. The data channel within the passband is upconverted to the roll-off spectrum and transmitted through the adjoining second access area which is interconnected to the first access area through a plurality of protection units. Each protection unit interconnects a side leg within each access area. When data service is interrupted to subscriber clients connected to a leg in the first area, the protection data channel is transmitted through the second access area to the protection unit connected to affected leg in the first area. The protection unit then downconverts the protection data channel to its normal carrier frequency within the passband and supplies it to the affected clients in the first access area, thereby restoring the subscribed-to data services to the subscribers.

12 Claims, 2 Drawing Sheets

SELF-HEALING CONFIGURATION FOR DELIVERING DATA SERVICES ON A HYBRID FIBER-COAXIAL (HFC) NETWORK

TECHNICAL FIELD

The invention relates to providing failure protection for data services in hybrid optical fiber-coaxial cable networks.

BACKGROUND OF THE INVENTION

In existing hybrid optical fiber-coaxial cable (HFC) networks which deliver cable TV services and high speed data services, protection does not exist against equipment or cable failures. Such HFC networks include a CATV head-end multi-services transmitter which optically transmits TV and data signals over a main leg fiber to a fiber node, at which node the optical signals are converted to electrical signals and distributed to subscribers in their homes or businesses by electrically tapping the signals off of side leg coaxial cables. Video signals are transmitted in 6 MHz wide standard NTSC (National Television Systems Committee) channels and data signals are transmitted in 6 MHz wide data channels using multi-level Quadrature Amplitude Modulation (QAM) techniques (e.g., 16-level, 64-level, or 256-level) or Quadrature Phase Shift Keying (QPSK) techniques. Using 16-level QAM or QPSK, for example, a 10 Mb/s data service can be accommodated in a single 6 MHz wide channel. Using 64-level QAM, 30 Mb/s can be transmitted in that same channel. With 30 Mb/s, up to 1000 subscribers can be serviced on a single data channel when it is assumed that 10 per cent of such subscribers are simultaneously using the network for data services.

In an HFC network, when a break or equipment failure occurs along the optical fiber in the main leg, or along the coaxial cable on a side leg between the fiber node and a tap, service is disrupted to all the end-users connected to the network beyond the break or failure. Typically, the downtime of existing hybrid fiber-cable networks is approximately 600 to 1000 minutes per year per line.

There is currently a strong and ever-increasing demand from both residential and business customers for high-speed access to the Internet for applications such as web browsing, access to popular on-line services, access to various corporate intranets for work at and/or from home, distance learning, telemedicine, financial transactions, etc. Such high speed advanced data services can be delivered to customers over HFC networks. The long down-time of such networks as they currently exist, however, makes them unsuitable for high speed value-added data service offerings, which require high reliability, i.e. survivability plus availability, to meet customer expectations for such services.

SUMMARY OF THE INVENTION

Standard 6 MHz NTSC video signals and 6 MHz wide modulated radio frequency (RF) data carriers are transmitted within the passband of an HFC network. In accordance with the present invention, the unused high frequency roll-off spectrum above the cutoff frequency of coaxial amplifiers in the network is used for protection RF channels for data channels normally transmitted within the passband. In the event of a failure in either the fiber trunk, or a coaxial feed segment in the cable or an amplifier, a loss of RF signal is detected at at least one coaxial tap port, which loss of signal condition is relayed to the CATV head-end transmitter. In response thereto, the data signals then being transmitted to the affected subscribers on a carrier frequency within the passband are upconverted to a carrier frequency within the roll-off spectrum and transmitted to that part of the network experiencing the signal loss via an alternate signal path.

In the embodiment of the invention disclosed herein, the architecture of the network is arranged so that a plurality of video and data services subscriber clients in adjoining access areas are served by a common CATV multi-services head-end transmitter. In each area, subscriber clients are connected through addressable taps to side legs of the local distribution coaxial cable portion of the HFC network. Each of a plurality of protection units interconnect a side leg in a first access area with a corresponding side leg in the adjoining second access area through the addressable tap located at the terminating end of each side leg. When a controller connected to each of the taps in the first access area detects a signal failure that interrupts delivery of data services on a data channel to one or more clients connected through the taps along a side leg in that area, the CATV head-end transmitter responds by upconverting the carrier frequencies of the data channel to a channel within the roll-off spectrum and supplying to the affected clients the subscribed to data services on the protection data channel via the adjoining second access area. Specifically, the addressable tap at the terminating end of the affected side leg in the first access area and the addressable tap at the terminating end of the corresponding side leg in the adjoining second access area, which outputs are both blocked to the interconnecting protection unit under normal no-fault signal conditions, are fired on to enable signals to pass there through. Once fired on, the interconnecting protection unit receives, via the corresponding side leg in the adjoining second access area, the protection RF data channel transmitted by the CATV head-end transmitter in the roll-off spectrum. This protection unit downconverts the carrier frequency of this protection RF channel to its normal working carrier frequency, and outputs the downconverted protection data channel to the side leg in the first access area in which a signal failure has been detected. The protection RF data channel is then supplied to the affected side leg in the first access area through that leg's fired-on last addressable tap thereby enabling the data services to again be provided to all those affected clients in the first access area whose delivery of such services was interrupted. The network architecture is symmetrical in that a signal failure within the second access area is protected by transmitting a protection RF data channel in the roll-off spectrum through the first access area, which protection channel is downconverted by the common protection unit and provided to those clients connected to an affected side leg in the second access area and whose data services were interrupted due to the failure. Thus, a failure in either access area is self-healing in that service continues to be provided to the affected clients through the other access area.

DETAILED DESCRIPTION

Figure 1:
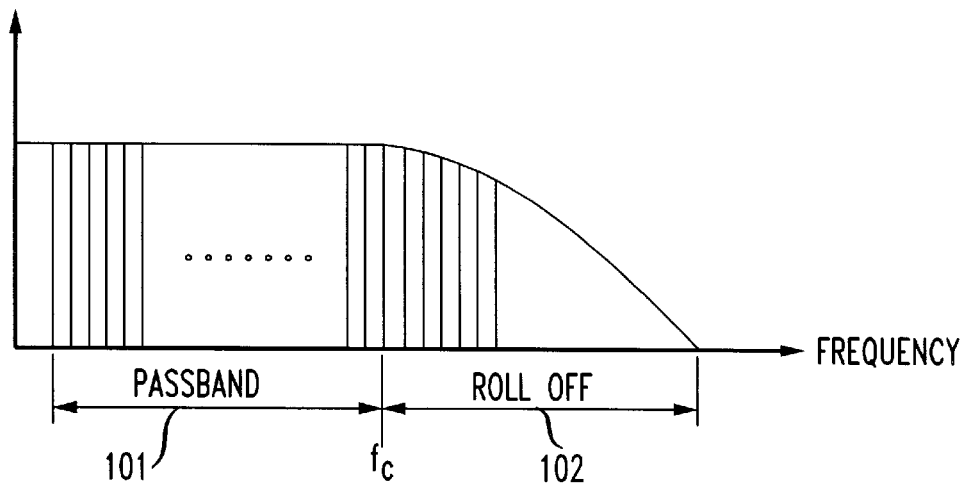
FIG. 1 is the frequency spectrum of a coaxial amplifier showing both the passband and roll-off spectrum.

With reference to FIG. 1, the frequency spectrum of a coaxial amplifier is shown. Such amplifiers are distributed throughout HFC and coaxial cable networks. The width of the passband 101 of such an amplifier limits the number of 6 MHz wide video or data channels that can be transmitted to subscribers connected to the network. Such amplifiers typically have cutoff frequencies of 330, 440, 550 or 750 MHz. For an exemplary amplifier with a cutoff frequency, $f_c$, of 750 MHz, 116 channels can be transmitted in the passband between 54 MHz and 750 MHz. It has been determined that whereas video channels cannot be supported above the cutoff frequency within the roll-off spectrum 102, six 6 MHz-wide data channels can in fact be supported in this spectrum. In accordance with the invention, these channels in the roll-off spectrum are used as protection channels against single point failures in a distribution network which supplies video and data services within the passband to a large number of subscribers.

Figure 2:
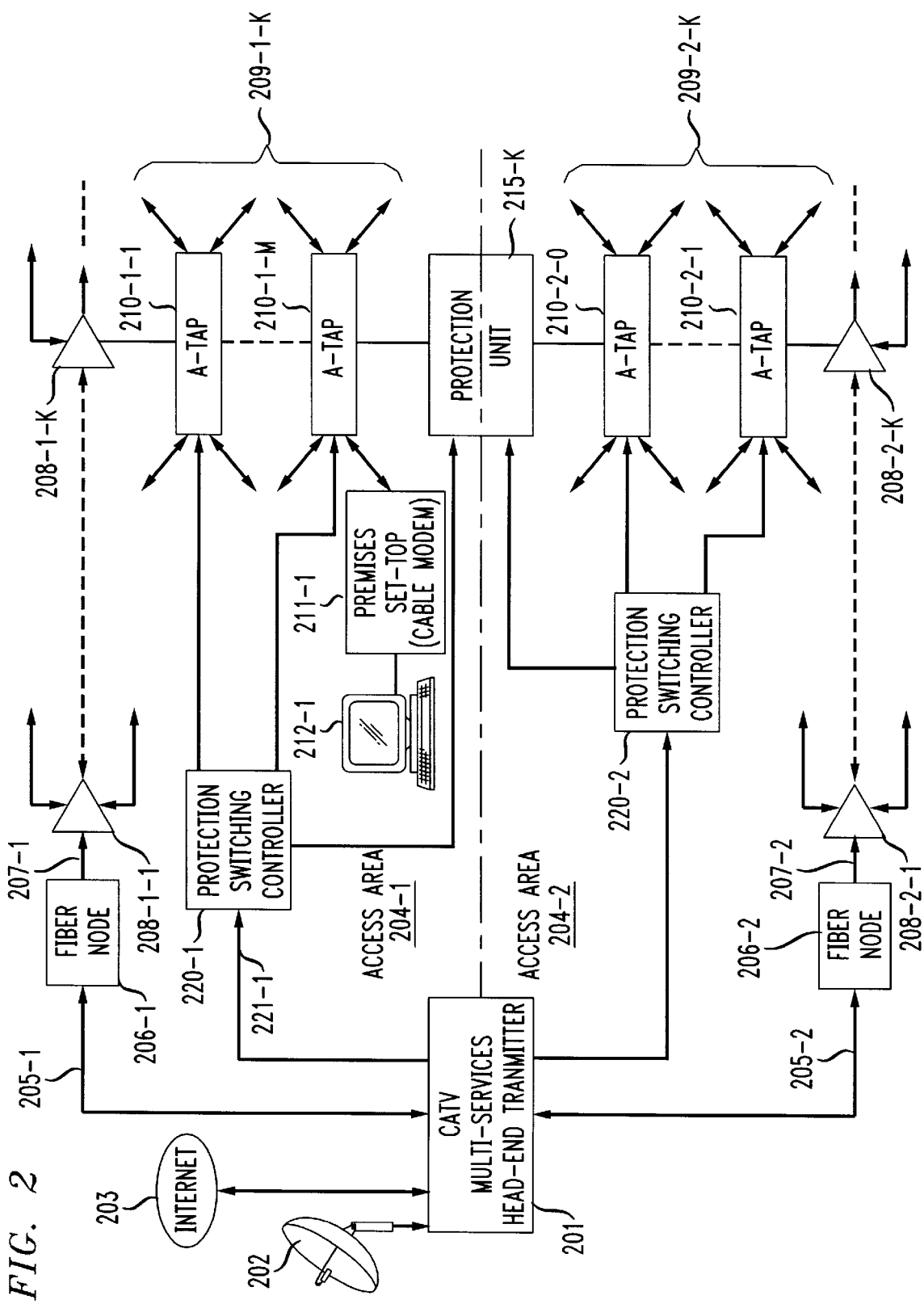
FIG. 2 is a network architecture showing an embodiment of the present invention.

With reference to FIG. 2, a network architecture is shown in which a single point failure which interrupts data service to subscribers in an access area is protected by delivery of the interrupted data services to these same subscribers through an adjoining access area via a protection channel in the roll-off spectrum. The network architecture includes a CATV multi-services head-end transmitter 201, which may be connected to a satellite dish 202 for receiving video signals which are transmitted to connected subscribers. Transmitter 201 is also connected to the Internet 203, through which subscribers can obtain access to high-speed data services. Unlike access through conventional POTS telephone lines in which data transmission speed are limited by the narrow bandwidth of the telephone channel, access to the Internet through a wider bandwidth HFC network enables connected subscribers to achieve significantly higher data rates through cable modems connected to their client terminals.

Head-end transmitter 201 supports two adjoining access areas 204-1 and 204-2. Transmitter 201 is connected via optical fiber trunk 205-1 in the first access area 204-1 to a fiber node 206-1. At fiber node 206-1, the optically transmitted signals are converted to electrical signals and outputted onto coaxial cable 207-1. The electrical signals are then distributed along a horizontal main leg street through line-extender coaxial amplifiers 208-1-k (k=1–N), each of which is bandwidth-limited, as discussed above. Subscribers are serviced off of multiport addressable coaxial taps on vertical side leg streets, such as side leg 209-1-k shown connected off of amplifier 208-1-k. At each addressable tap along side leg 209-1-k, such as addressable taps 210-1-1–210-1-M, a plurality of subscriber terminals are connected by coaxial cable through individual premises set-tops, such as 211-1, to their televisions (not shown), and/or through a cable modem (within or an adjunct to the set-top) to their personal computers, such as 212-1. Any terminal through which data services can be provided is collectively referred to herein as a client terminal, or more simply a client.

The adjoining second access area 204-2 is similarly configured. Thus optical fiber trunk 205-2 is connected to a fiber node 206-2, which in turn converts transmitted optical signals into electrical signals for output and transmission on a horizontal main leg street to a plurality of vertical side leg streets. As in the first access area 204-1, the converted electrical signal is transmitted by fiber node 206-2 through a series of line-extender coaxial amplifiers 208-2-k (k=1–N) and fed to the vertical side leg streets. Amplifier 208-2-k feeds side leg 209-2-k. Subscriber clients are fed off of multiport addressable coaxial taps 210-2-1–210-2-P along that side leg.

The terminating addressable tap 210-1-M in side leg 209-1-k in access area 204-1 is connected through a protection unit 215-k to the terminating addressable tap 210-2-P in access area 204-2. These two terminating addressable taps are normally off, preventing the signals transmitted in the first and second access areas from reaching protection unit 215-k. As will be described hereinafter, when a signal failure is detected in either access area along side legs 209-1-k or 209-2-k, both of these terminating addressable taps are fired on, thereby providing a signal path from each to the protection unit 215-k.

A protection switching controller 220-1 and 221-2 located in access areas 204-1 and 204-2, respectively, is connected to each tap within its area to monitor signal conditions within the area. In the event of a cable failure in the first access area 204-1 in either the fiber trunk 205-1 or any coaxial feeder segment of the network, protection switching controller 220-1 detects a loss of RF signal at certain or all of the addressable coaxial tap ports in the area. Protection switching controller 220-1, in response to such condition, transmits an electrical control signal to the terminating addressable taps in the side leg experiencing a signal loss to fire on that tap, and to protection unit 215-k. Thus, for example, if a signal loss is detected in side leg 209-1-k, controller 220-1 transmits a signal to tap 210-1-M, to connect the output of that tap to protection unit 215-k. Controller 220-1 simultaneously transmits a signal over line 221-1 to the CATV head-end transmitter informing it of the signal loss and its location within the first access area 204-1. In response thereto, head-end transmitter 201 transmits a signal over lead 221-2 to protection switching controller 220-2 in the second access area 204-2. Protection switching controller 220-2 then signals protection unit 215-k and addressable tap 210-2-P, the latter for connecting the output of addressable tap 210-2-P to protection unit 215-k. The CATV head-end 201 then also upconverts the carrier frequency of the RF modulated QAM/QPSK data signals, (normally located within the passband coaxial amplifier spectrum), intended for the addressable coaxial taps in access area 204-1, to carrier frequencies corresponding to one or more unused RF channel(s) in the high-frequency roll-off spectrum.

Figure 3:
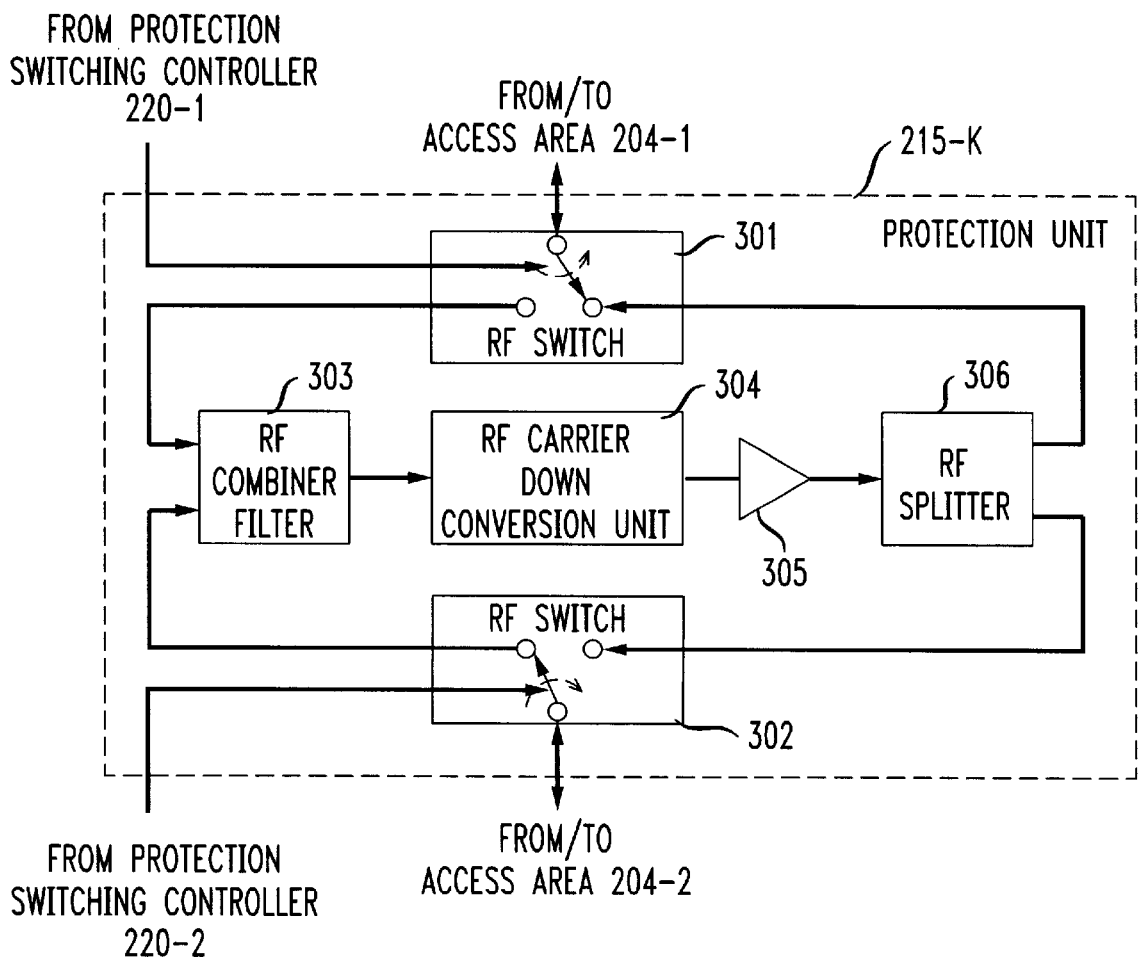
FIG. 3 is a block diagram of a protection unit used in FIG. 2.

The upconverted RF protection data channel(s) is (are) then transmitted by the head-end 201 along with the normal working RF data channels in the second adjoining access area 204-2. When the signal reaches the enabled addressable tap 210-2-P, it is passed through to protection unit 215-k. With reference to FIG. 3, protection unit 215-k serves to downconvert the RF protection data channels to their normal set of working carrier frequencies.

Protection unit 215-k operates symmetrically with inputs provided from the first and second access areas 204-1 and 204-2 through RF switches 301 and 302, respectively. When a signal loss is detected in side leg 209-1-k in the first access area 204-1 and protection switching controller 220-2 is signaled by head-end 201, protection unit 215-k is also signaled. Specifically, RF switch 302, in response thereto, is set to connect its input/output from the second access area 204-2 to an output of the switch connected to an input of an RF combiner/filter 303. Similarly, in response to a signal from protection switch controller 220-1 in the first access area 204-1, RF switch 301 is set to connect the input/output from the first access area 204-1 to an output of RF splitter 306. Thus, in response to a signal failure in the first access area, the RF protection channels transmitted by the head-end transmitter 201 through the second access area are passed from the output of the enabled addressable tap 210-2-P to switch 302 in protection unit 215-k and thence to an input of RF combiner and filter 303. The second input of this combiner/filter 303 is null since RF switch 301 is at this time provides no signal output to combiner/filter 303. Combiner/filter 303 filters the signals within passband spectrum and outputs the RF protection data channel(s) in the roll-off spectrum to RF carrier downconversion unit 304. The latter downconverts the carrier frequencies of the protection channel(s) to its (their) normal passband carrier frequencies. The downcoverted protection channel(s) is (are) then amplified by a coaxial amplifier 305 and inputted to an RF splitter 306, which splits the power of the downconverted protection channel(s) in half, supplying one-half each to switches 301 and 302. Since switch 302 connects the input/output from/to the second access area 204-2 to the input of combiner/filter 303, it is not responsive to the output of RF splitter 306. Switch 301, on the other hand, passes the output of RF splitter 306 to the first access area 204-1, where it is transmitted through enabled addressable tap 210-1-M. The protection data channels are then supplied to clients of those subscribers connected off side leg 209-1-k and whose service was interrupted due to an equipment failure or cable break.

In the event of an equipment failure or break within the second adjoining access area 204-2, protection RF data channels are similarly supplied to the affected sidle legs by transmitting the protection RF data channels in the roll-off spectrum of the signals transmitted by head-end 201 through the first access area 204-1. It is readily apparent to one skilled in the art, that protection unit 215-k operates in a symmetrical manner. Thus, the signals in the passband and roll-off spectrum that are outputted by addressable tap 210-1-M pass through RF switch to RF combiner/filter 303. The RF protection data channel(s) is (are) then downconverted by unit 309 to carrier frequencies within the passband, amplified, and passed by splitter 306 to RF switch 302, where it (they) are outputted to the second access area 204-2. The network configuration of the present invention is therefore self-healing in that data services continue to be delivered through an adjoining access area to the clients of subscribers in their own access area to which direct delivery of such services through their own access area has been interrupted due to a failure.

Although each of the coaxial taps in the embodiment described hereinabove are noted as being addressable taps, it should be noted that only the terminating tap in each side leg needs to be addressable by the protection switching controller. Each other tap in each side leg alternatively could be a nonaddressable bilateral coaxial tap which passes signals in either direction.

The above-described embodiment is illustrative of the principles of the present invention. Other embodiments could be devised by those skilled in the art without departing from the spirit and scope of the present invention.

The invention claimed is:

1. In a network including a coaxial cable distribution portion over which data services are provided to a plurality of subscriber clients on an RF modulated data channel at a carrier frequency within the passband of a coaxial amplifier connected within the coaxial cable distribution portion, a method of providing for protection against a failure that interrupts delivery of the data services to at least one of the subscriber clients, the method comprising the steps of:

detecting the interruption of the delivery of the data services to at least one of the subscriber clients;

upconverting the carrier frequency of the data channel to a protection data channel having a carrier frequency within a roll-off spectrum of the coaxial amplifier; and transmitting over an alternate transmission path the protection data channel to at least one of the subscriber clients to which data service has been interrupted.

2. The method of claim 1 further comprising the step of downconverting the protection data channel to the carrier frequency within the passband before it is provided to at least one of the subscriber clients to which data service has been interrupted.

3. The method of claim 1 wherein each subscriber clients is located in a first or a second access area, and in response to the step of detecting the interruption of delivery of data services to at least one of the clients which is located in either the first or second access area, the step of transmitting the protection data channel is through an alternate transmission path through the other access area.

4. The method of claim 3 wherein the first and second access areas are adjoining.

5. In a hybrid fiber-coaxial cable (HFC) network including a head-end transmitter connected to a fiber trunk portion, and a coaxial cable distribution portion interconnecting the fiber trunk portion and a plurality of subscriber clients located in a first access area, and in which data services are transmitted from the head-end transmitter on an RF modulated data channel at a carrier frequency within the passband of a coaxial amplifier connected within the coaxial cable distribution portion, a method of providing for protection against a failure that interrupts delivery of the data services to at least one of the subscriber clients located in the first access area, the method comprising the steps of:

detecting the interruption of the delivery of the data services to at least one of the subscriber clients located in the first access area;

signaling the head-end transmitter of the interruption of the delivery of the data services;

at the head-end transmitter, in response to being signaled of the interruption, upconverting the carrier frequency of the data channel to a protection data channel having a carrier frequency within a roll-off spectrum of the coaxial amplifier; and from the head-end transmitter, transmitting over an alternate transmission path the protection data channel to at least one of the subscriber clients to which data service has been interrupted.

6. The method of claim 5 further comprising the step of downconverting the protection data channel to the carrier frequency within the passband before it is provided to at least one of the subscriber clients in the first access area to which delivery of data services has been interrupted.

7. The method of claim 5 wherein the head-end transmitter is connected to a second fiber trunk portion, and a second coaxial cable distribution portion interconnects the second fiber trunk portion and a plurality of different subscriber clients located in a second access area, the alternate transmission path in the step of transmitting over an alternate transmission path being over the second fiber trunk portion and the second coaxial cable distribution portion in the second access area.

8. The method of claim 7 wherein the first and second access areas are adjoining.

9. A hybrid fiber-coaxial cable (HFC) network for distributing data services comprising:

a head-end transmitter for transmitting the data services on an RF modulated data channel at a carrier frequency within the passband of a coaxial amplifier within the network;

first and second adjoining access areas, each access area comprising a fiber trunk portion connected to the head-end transmitter, and a coaxial cable distribution portion interconnecting the fiber trunk portion and a plurality of subscriber clients located within the access area, and a controller for detecting an interruption of delivery of the data services to at least one of the subscriber clients within the access area and signaling the head-end transmitter of the interruption;

means associated with said head-end transmitter for upconverting the carrier frequency of the data channel to a protection data channel at a carrier frequency within a roll-off spectrum of the coaxial amplifier in response to the controller in one of the access areas detecting an interruption of delivery of the data services and for transmitting the protection data channel through the other of the access areas; and protection means interconnecting the first and second access areas for receiving the protection data channel transmitted through the other of the access areas, downconverting the protection data channel to the carrier frequency within the passband, and providing the downconverted protection data channel at least one of the subscriber clients to which delivery of data services has been interrupted.

10. The network of claim 9 wherein the first and second access areas adjoin each other.

11. The network of claim 10 wherein the coaxial cable distribution portion in each access area comprises at least one side leg, and at least one tap connected to the side leg to which at least one client is attached.

12. The network of claim 11 wherein a side leg in the first access area is associated with a side leg in the second access area, a first addressable tap being connected at a terminating end of the side leg in the first access area and a second addressable tap being connected at a terminating end of the associated side leg in the second access area, said first and second addressable taps being connected to said protection means, wherein said first and second addressable taps are fired on to pass the protection data channel to and from the protection means in response to an interruption of the delivery of data services to a client attached to the side leg in the first access area or the associated side leg in the second access area.

* * * * *